United States Patent
Koch et al.

(10) Patent No.: US 8,776,149 B1
(45) Date of Patent: Jul. 8, 2014

(54) PREFERENCE-BASED MEDIA ALERTS

(75) Inventors: Robert Koch, Norcross, GA (US); Steven N. Tischer, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 727 days.

(21) Appl. No.: 11/682,166

(22) Filed: Mar. 5, 2007

(51) Int. Cl.
*H04N 7/173* (2011.01)
*G06F 3/00* (2006.01)

(52) U.S. Cl.
USPC .................................. 725/88; 725/37; 725/38

(58) Field of Classification Search
USPC ................................ 725/9–14, 34–35, 45–46
See application file for complete search history.

(56) References Cited

U.S. PATENT DOCUMENTS

| | | | | |
|---|---|---|---|---|
| 6,008,802 A * | 12/1999 | Iki et al. | | 725/139 |
| 6,061,056 A * | 5/2000 | Menard et al. | | 725/139 |
| 6,668,278 B1 * | 12/2003 | Yen et al. | | 725/116 |
| 2003/0070182 A1 * | 4/2003 | Pierre et al. | | 725/135 |
| 2003/0208755 A1 * | 11/2003 | Zimmerman | | 725/34 |
| 2004/0044736 A1 * | 3/2004 | Austin-Lane et al. | | 709/206 |
| 2005/0086688 A1 * | 4/2005 | Omoigui | | 725/35 |
| 2005/0094031 A1 * | 5/2005 | Tecot et al. | | 725/136 |
| 2005/0102607 A1 * | 5/2005 | Rousselle et al. | | 715/501.1 |
| 2005/0246732 A1 * | 11/2005 | Dudkiewicz et al. | | 725/13 |
| 2006/0064721 A1 * | 3/2006 | Del Val et al. | | 725/41 |
| 2006/0156326 A1 * | 7/2006 | Goronzy et al. | | 725/13 |
| 2006/0271968 A1 * | 11/2006 | Zellner | | 725/81 |
| 2006/0277579 A1 * | 12/2006 | Inkinen | | 725/73 |
| 2007/0156726 A1 * | 7/2007 | Levy | | 707/100 |
| 2007/0168342 A1 * | 7/2007 | Singerman et al. | | 707/5 |
| 2007/0174862 A1 * | 7/2007 | Kushida et al. | | 725/15 |
| 2007/0192807 A1 * | 8/2007 | Howcroft | | 725/61 |

* cited by examiner

*Primary Examiner* — John Schnurr
*Assistant Examiner* — Michael Telan
(74) *Attorney, Agent, or Firm* — Wolff & Samson PC

(57) ABSTRACT

When a user is consuming media content from a first source, one or more other available sources of media content may be monitored and the user may be notified if other available content matches the user's profile.

18 Claims, 6 Drawing Sheets

PREFERENCE-BASED MEDIA ALERTS

BACKGROUND

Media content may be consumed by a user from a variety of substantially real-time sources (e.g., broadcast radio or television, satellite radio or television, webcast, or other transient media) and non-real-time sources (e.g., compact disk, digital video disk, computer memory, on-demand video, or other recorded media sources). The available sources of media content are becoming increasingly plentiful and varied. At any given time, there may be multiple pieces of media content that are of varying degrees of interest to a user. Because of the varied nature of the media content, it may be difficult for a user to navigate through the available content. Accordingly, a user may be unaware of some or all of the media content of interest available at any given time.

Also, a user occupied consuming a piece of media content may not be aware of another piece of available content of equal or greater interest than the piece of media content currently being consumed. For example, a user occupied watching a movie, listening to an album, reading web content, or consuming other media content may not be aware of real-time content of interest, such as pertinent weather alerts, breaking news, instances of favorite actors or artists, activation of a home or car alarm, or the like.

SUMMARY

This summary is provided to introduce simplified concepts of preference-based media alerts, which are further described below in the Detailed Description. This summary is not intended to identify essential features of the claimed subject matter, nor is it intended to limit the scope of the claimed subject matter.

In one aspect, a method of providing preference-based media alerts is disclosed, in which a media system presents media content from a first media content source on a presentation device. The media system also communicates with a second media content source, and compares information associated with the second media content source with information stored in a user profile. Based on the comparison, the media system determines if any content available from the second media content source matches the user profile and, if so, alerts the user of the match.

In another aspect, a media system is disclosed, which includes memory storing non-real-time media content for presentation and a real-time media input configured for connection to a source of substantially real-time media content. The media system includes an output to a presentation device for presenting media content to a user. A user profile store is coupled to the media system and includes information about user media content preferences. A comparator of the media system compares information associated with the substantially real-time media content from the real-time media input with information in the profile store, and a notification module alerts the user if the comparator determines that content from the real-time media input is available that matches the user profile.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to preference-based media alerts usable to notify a user when content is available that may be of interest to the user. As media content continues to become increasingly plentiful, it will become increasingly difficult for a user to navigate through the vast quantities of available content, and to keep track of media content that they desire to view, listen to, read, or otherwise consume. Also, a user occupied watching a movie, listening to an album, reading web content, or consuming other media content may not be aware of available real-time content of equal or greater interest, such as pertinent weather alerts, breaking news, sporting events, appearances of favorite performers, and the like. Preference-based media alerts may be used to notify users of media content that is potentially of interest to them, and may assist them in navigating to that media content. Generally, when a user is consuming media content from a first source, a media system monitors one or more other available sources of media content and notifies a user if other available content matches the user's profile.

Preference-based media alerts may be used in connection with virtually any type of presentation devices including, without limitation, personal computers (PCs), portable computers (e.g., laptops and portable PCs), media centers, televisions, set top boxes, receivers, smartphones, personal digital assistances (PDAs), wireless phones, game consoles, combinations of any of these, and the like. In addition, preference-based media alerts may be applicable to any presentation device having one or more sources of substantially real-time media content (e.g., broadcast, cable, or satellite television or radio, webcasts, or other transient content) and/or non-real-time media content (e.g., recorded video, audio, text, multi-media, games, or other fixed media readily accessible by a consumer).

In various implementations, preference-based media alerts may be generated locally by a presentation device or remotely by a device located elsewhere on the network. Also, preference-based media alerts or other communications may be communicated over conventional local or wide area networks, such as the Internet, local intranets, or wireless and/or wireline telephone networks, for example.

Exemplary Preference-Based Media Alert Systems

Figure 1:
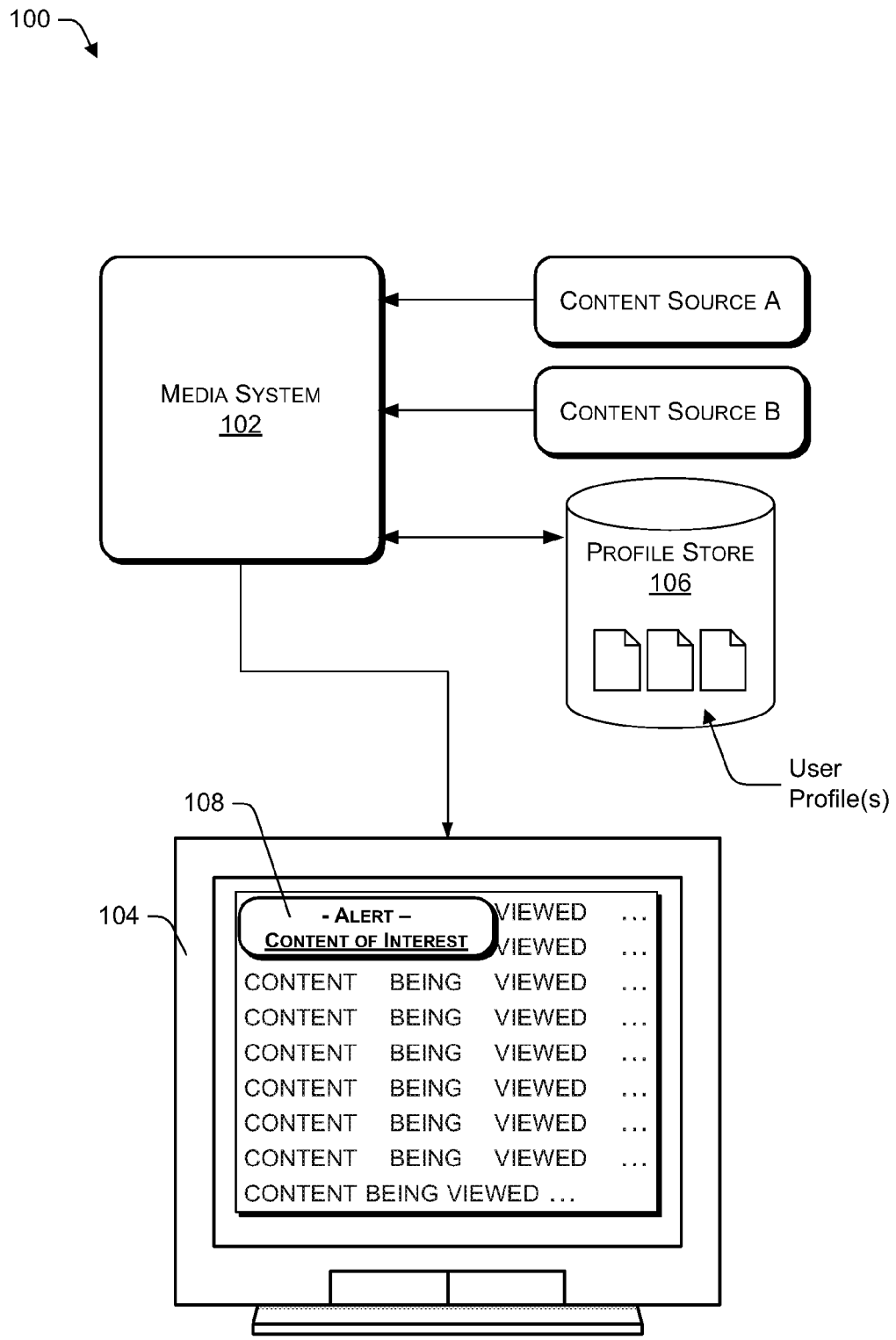
FIG. 1 is a schematic view showing an exemplary system usable for preference-based media alerts.
Figure 2:
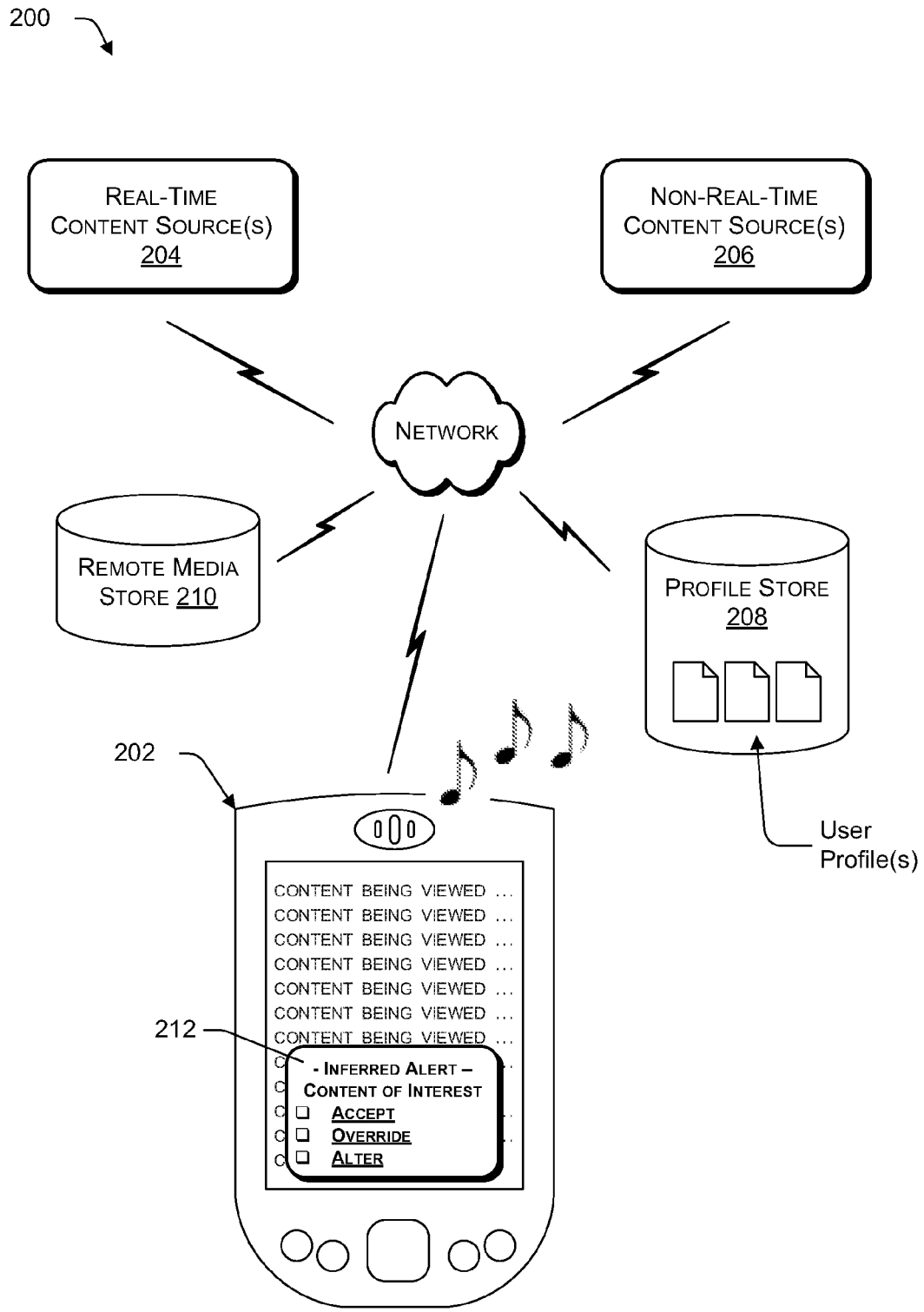
FIG. 2 is a schematic view showing another exemplary system usable for preference-based media alerts.

FIGS. 1 and 2 illustrate two exemplary preference-based media alert systems. However, it should be understood that numerous other systems could be used to implement preference-based media alerts in various forms.

FIG. 1 shows an exemplary preference-based media alert system 100 comprising a media system 102 coupled to a presentation device 104 for presentation of media to a user. In this example, the presentation device 104 is shown as a display screen separate from the media system 102. However, in other implementations, the presentation device 104 could be integral with the media system 102 and may include audio, visual, and/or tactile presentation capabilities.

The media system 102 is coupled to two external sources of media content, media content source A and media content source B, and to an external profile store 106 that contains user profile information. It should be understood, however, that the media system 102 may in other implementations include any number of one or more content sources. Also, any of the content sources may be external to the media system 102, as shown in FIG. 1, or may be internal to the media system 102.

Each media content source may include substantially real-time content, non-real-time content, or a combination of the two. Sources of substantially real-time content generally include those sources for which content is changing over time, such as, for example, broadcast, cable, and satellite television and radio, webcasts, and other transient content. Non-real-time content sources generally include fixed media readily accessible by a consumer, such as, for example, pre-recorded video, audio, text, multimedia, games, or other media stored locally or remotely on computer-readable media.

A user consuming media from content source A on the presentation device 104 may or may not be aware of other content currently being provided by the content source B. The media system 102 is configured to monitor content available from content source B and any other content sources, and to compare the available content with the user's content preferences in the profile store 106. According to exemplary implementations, the media system 102 generates an alert 108 to notify the user if content is available that, based on the user's profile, is of equal or greater interest to that presently being consumed. In this implementation, the alert is shown as a textual alert that is overlaid over content being viewed. However, in other implementations, the alert may include audible, visual, and/or tactile notifications.

Each user's content preferences are stored in a user profile or subscription on the profile store 106. In one implementation, users register or subscribe for media alerts. Upon registration, an account is created for each user and is associated with one or more sources of media content. The user profile may be located in memory of the media system 102, a service provider of one of the content sources, and/or a third party computing device. The user profile may be generated or modified by the user manually inputting preference information and/or by intelligently inferring the user's preferences from the user's history of consumption.

Manual entry of preference information may be done through a freeform interface, a structured interface, or a combination of these. For example, a user may be allowed to enter specific keywords or search terms in a freeform interface and/or answer specific questions in a structured interface. The user profile may include general preference information (e.g., I like sports, I dislike comedies, I like rock and roll, etc.), specific items or criteria of interest or disinterest (e.g., a program, object, person, event, or characteristic), or any other criteria desirable or undesirable to the user. The profile may also allow a user to rank content from highest to lowest interest, to assign weighted values to content, or otherwise prioritize the content.

The preference information may be manually entered via a user interface of the media system 102, a web interface, or the like. In one implementation, users may access and modify their profiles using a computer or other terminal (not shown) coupled to the media system 102 directly or through a network. Through the terminal, users can view, update, and modify their preference information. The profile store 106 may store data on a single storage media or multiple storage media distributed over the network.

The user profile may additionally or alternatively be generated or modified by intelligently inferring the user's preferences from the user's history of consumption. That is, the user's media consumption behavior may be monitored and the preferences may be inferred by, for example, deduction or induction from the user's previous consumption behavior. In one example, if a user has in the past switched from watching a documentary on aircraft to watch a professional basketball game, the media system 102 may make a general inference as to the type of programming the user likes (e.g., the user prefers sporting events to documentaries), an inference about the subject matter the user likes (e.g., the user prefers basketball to aircraft), and/or an inference about specific people/places/things that the user likes (e.g., the user prefers a specific basketball player or team to a specific aircraft). Inferences may be made the first time the user takes a certain action, after multiple occurrences of the same or similar action, or based on some discernable pattern or viewing habit. Inferences may be, but generally are not, made if a user repetitively changes through channels, content sources, or content types. Of course, the system 102 may make numerous additional or alternative inferences based on one or more user selections, changes, and/or viewing habits. The following are just a few examples of other inferences that the system 102 may make in some instances:

- If a user changed channels to catch just the end of a basketball game, the system 102 may infer that the user prefers the last few minutes of basketball games or sporting events in general, and may alert the user at a predetermined period before the end of a game.
- If a user changes to content featuring a specific person/location/item/event, the system may infer that the user has a preference for that person/location/item/event and may alert the user when that person/location/item/event appears or is referenced in other media content (e.g., if a user watches a documentary on Bob Dylan, the system may alert the user when Bob Dylan songs are played on the radio). The alert may be to the whole program, song, article, etc., or to only a portion thereof.
- If a user regularly changes to a specific channel or content source, the system 102 recognizes a preference for that channel or content source.
- If a user regularly consumes content of one type (e.g., audio recordings) featuring a specific person/location/item/event, the system 102 may alert the user when content of another type featuring the same person/location/item/event is available (e.g., video or text).
- User preferences may be weighted based on behavior. For example, the more often a user changes from one content type or subject matter to another, the higher the weight assigned to that preference.
- The system 102 may infer a user's interest based on the user's geographic location (e.g., a weather or traffic advisory for a specific location), age, gender, or other indicia.

FIG. 2 illustrates another exemplary preference-based media alert system 200. The preference-based media alert system 200 of this implementation includes a media system 202 configured as a portable computing device, such as a Smartphone, pocket PC, PDA, or the like. The media system 202 is in wireless communication with one or more substantially real-time content sources 204, one or more non-real-time content sources 206, and one or more profile stores 208 storing user profile information via a network. The media system 202 in this implementation includes an integral presentation device (in this case a display screen and a speaker). The media system 202 is also in communication with a remote media store 210 via the network, which may receive content transmitted from the media system 202, store media content accessible by the media system 202, and/or record content at the request of the media system 202.

In most respects, the media system 202 of FIG. 2 functions similarly to that of FIG. 1. For example, if a user is occupied consuming media from the real-time content source 204 or the non-real-time content source 206, the media system 202 will generate an alert 212 notifying the user if content becomes available that is of equal or greater interest than the content being consumed. In one specific example, if the user is reading email or browsing the internet, the user may be notified if a preferred artist or song comes on, a sporting event featuring a favorite team comes on, or the like.

As discussed above, the profile store may be generated by a combination of manual input and inferential input from monitoring the user's behavior or history of consumption. In that case, the user may be able to manually alter or override inferred preferences by logging into his or her user profile via a web page, on-screen menu, or the like. Additionally or alternatively, if an alert is generated based on an inference, the user may have the option to accept, alter, or override the inferred preference information via a selection of options in the alert itself. Such an implementation is shown in the alert 212 of FIG. 2. If the user selects "accept" the inferred preference will be stored in the user's profile. If the user selects "override," the preference will not be stored in the user's profile. If the user selects "alter," the user may be given the option of narrowing the inference (e.g., narrowing "I prefer sporting events to documentaries" to "I prefer professional basketball games to aircraft documentaries"), broadening the inference, selecting specific subject matter from for the preference (e.g., a specific basketball player or team, a specific make or model of aircraft, or the like), placing a condition on the preference, or otherwise changing the inferred preference.

While components of the preference-based media alert systems 100, 200 are shown generally as being separate network devices, in other implementations, some or all of the components could be combined or integrated. Also, while only one of each component is shown, the preference-based media alert systems 100, 200 could include any number of media systems, content sources, profile stores, presentation devices, media stores, as well as various other network devices.

Exemplary Alert

Figure 3:
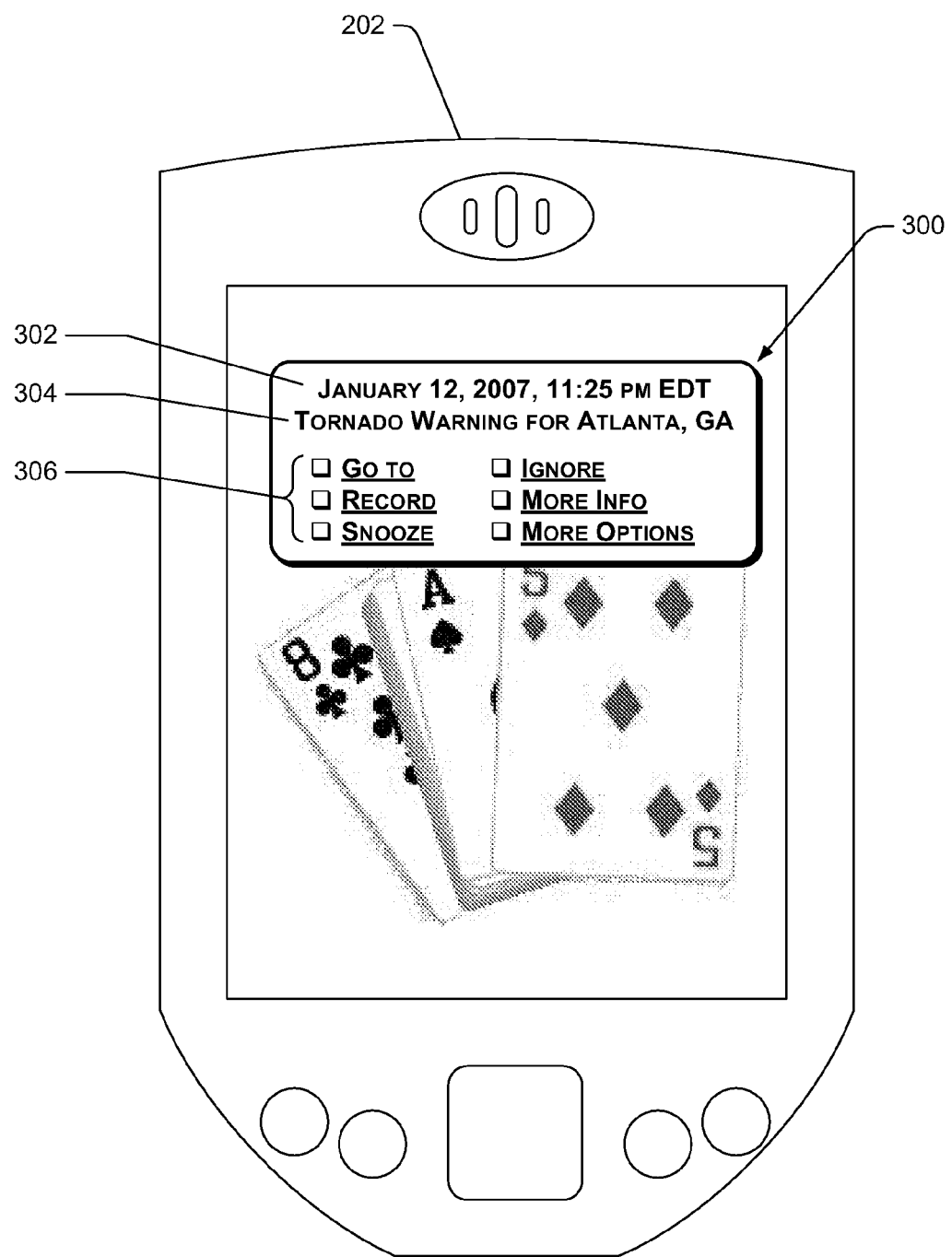
FIG. 3 is a schematic view showing a display device displaying media content and an exemplary preference-based media alert.

FIG. 3 shows the media system 202 of FIG. 2, showing one exemplary alert 300 that may be displayed to a user. In this example, the user is occupied consuming media content in the form of a video card game. The media system 202, however, is monitoring the available media sources and, based on the user's profile, determines that the user may be interested in knowing about a tornado warning for Atlanta, Ga. The alert could have been generated because of a user preference for "Atlanta," "tornados," "weather advisories," or some other preference in the user's profile. Moreover, the preference could have been automatically generated because, for example, the media system 202 happens to presently be in Atlanta, the user's address is in Atlanta, the user has searched the internet for tornados or watched a program on tornados, or for a wide variety of other reasons. Additionally or alternatively, the preference could have been manually entered by the user.

The user profile information is compared to information associated with available media content. Such information may be a part of the content itself, may be appended to the content, or may be derived from the content by the media system or a third party. By way of example and not limitation, information that may be used to determine content of interest to a user includes: the title, summary, program guide listings, index information, closed captioning transcripts, voice recognition, optical character recognition (of images), the text itself if the media is text, as well as any other available information.

The alert 300 shown in FIG. 3 includes a time stamp 302 indicating when the alert was generated, displayed, updated, or the like. The time stamp 302 serves as a mechanism for a user to know how current an alert is. It also allows the user to discern real-time alerts from recorded media that purports to be "live" but in fact occurred in the past. If the alert is for content that is not yet available, the alert may also include an indication of when the alerted content will occur and/or an indicator of time until the content will be presented (e.g., "tip off at 7:00 pm EDT," or "tip off in five minutes," or a timeline or other visual representation of the time remaining). Conversely, if the content has already begun to be presented, the alert may include an indication of the portion of the content that has elapsed (e.g., "started at 7:00 pm EDT," "fifteen minutes remaining," "00:15/1:00," or a timeline or other visual representation of the time elapsed and/or remaining).

According to exemplary embodiments, following the time stamp 302, the alert 300 includes an alert body or message 304. In this case, the alert message 304 is textual and reads "Tornado Warning for Atlanta, Ga." However, in other implementations, the alert message 304 may be text, audio, and/or video, and may include a title of the media content, a short description of the content, a rating of the media content, or any other pertinent information about the alerted content.

The alert 300 also includes a number of response options 306, from which the user may select an action in response to the alert 300. The response options 306 may be configured as hyperlinks, buttons, checkboxes, or any other suitable user interface elements. In the illustrated implementation, the response options 306 include commands to "Go To," "Ignore," "Record," "More Info," "Snooze," and "More Options." Selection of the "Go To" command causes the media system 202 to change over to present the content referenced in the alert 300. After the alert media has been presented, the media system 202 may remain on the new channel or content source, or may return to again present the original content that was being consumed prior to the alert.

The "Ignore" command dismisses the alert, and the media system 202 continues to present the original media content without interruption.

The "Record" command causes the media system 202 to begin recording the content referenced in the alert 300 using a local or remote recording device, such as a digital video disk (DVD) recorder, video cassette recorder (VCR), computer hard disk drive, or other recordable computer-readable media.

The "More Info" command causes the media system 202 to retrieve and/or display additional information about the content referenced in the alert 300. In the example of FIG. 3, selecting the "More Info" command might display information such as the duration of the tornado warning, the geographic area affected, the content source or network providing the tornado warning content, an author or orator, wind speeds, or countless other information. Of course, in other implementations, some or all of this additional information might be displayed in the original alert message 304 without requiring the user to request more information.

The "Snooze" command causes the media system 202 to hide or suppress the alert 300 for a predetermined duration. In one example, the "Snooze" command might cause the alert 300 to be hidden for ten minutes and then the alert will again notify the user of the alert content.

The "More Options" command causes the media system 202 to present additional options for responding to the alert 300, such as to "Overlay" the content referenced in the alert on the content currently being presented, to open a "New Frame" of media content to display the content referenced in the alert, or any number of other options.

In other implementations, the alert 300 itself or the alert message 304 may serve as a pointer, which when selected, directs the media system 202 to change to the alerted media content. In that case, fewer of the response options 306 need be provided, or the response options 306 may be omitted entirely. In still other implementations, selecting the alert 300 or the message body 304 may trigger some other result, such as displaying more information about the alert (e.g., the format of the media content, the duration of the content, the source of the content, a further description of the content, or the like).

Figure 4:
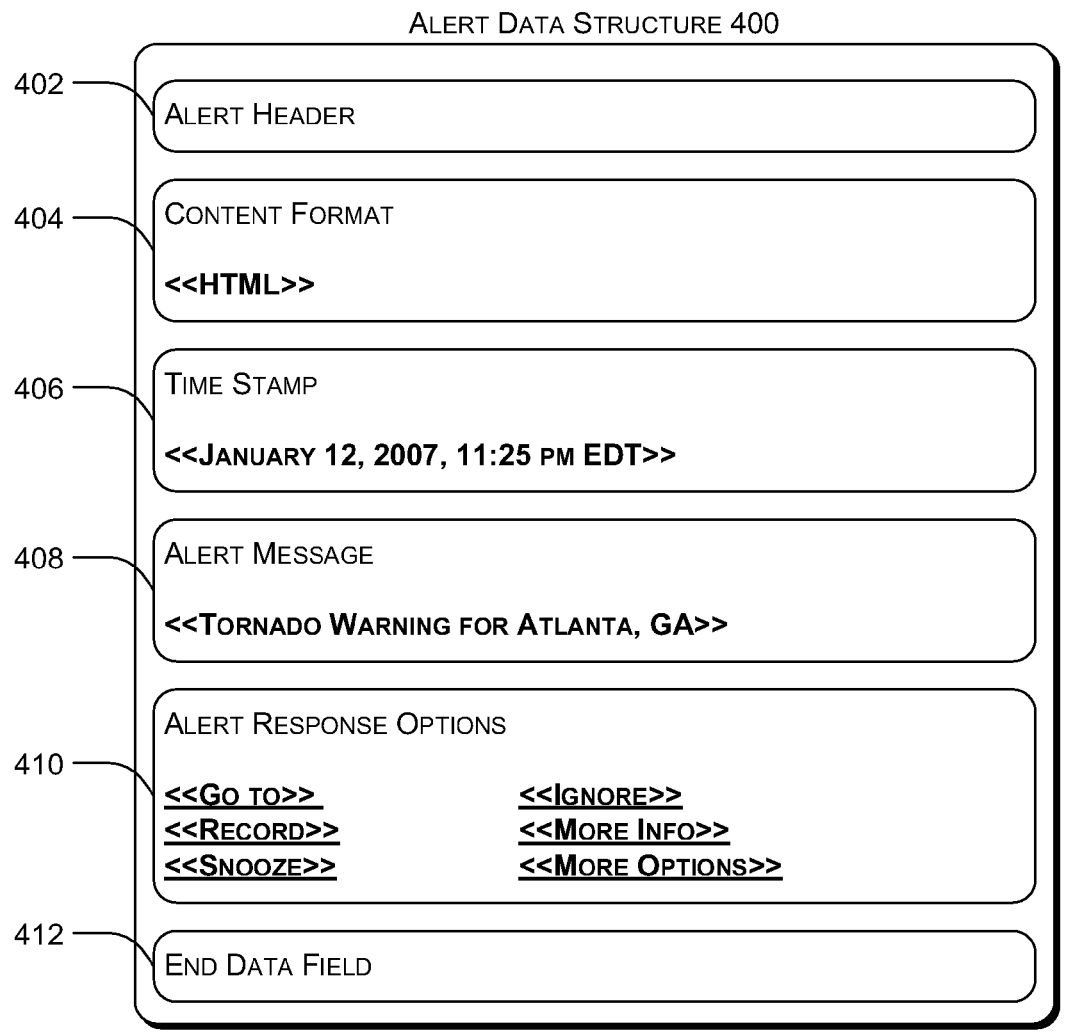
FIG. 4 is a schematic block diagram of an exemplary data structure representing a preference-based media alert.

FIG. 4 is a schematic view showing an exemplary data structure 400 of an alert, such as the alert 300 shown in FIG. 3. According to exemplary implementations, the alert data structure 400 includes a header field 402 that designates the beginning of the data structure, an alert format field 404 designating a format of the alert, a time stamp field 406, an alert message field 408, an alert response options field 410, and an end data field 412. The alert format field 404 designates a format of the alert (e.g., hypertext markup language or HTML, extensible markup language or XML, motion picture experts group or MPEG, text or TXT, flash media, or any other suitable alert format).

The time stamp field 406 is a temporal indicator designating a time associated with the alert, such as when the alert was first generated, when the content referenced in the alert became available, or the like. Also, as the alert data structure 400 is transmitted and received, the time stamp may be updated to reflect times at which the alert was transmitted, relayed, and/or received by the media system.

The alert message field 408 may include an alert message, such as the alert message 304, including a title, description, announcement, video clip, or other information referencing content in which the user may be interested. In the described implementations, the alert message 304 of the alert message field 408 is relatively succinct so as not to significantly disrupt content currently being consumed. However, in other implementations, the alert message 304 may be more comprehensive.

The alert response options field 410 includes a list of options available to the user for responding to the alert 300. The alert response options field 410 also may include any necessary pointers, addresses, bookmarks, feeds (e.g., Really Simple Syndication—RSS), or commands necessary to direct the media system to perform the corresponding action. For example, the "Go To" command may be accompanied by a pointer to a channel, uniform resource locator (URL), or other address of the content referenced in the alert. As discussed above, numerous other response options are possible, in which case the alert response options field 410 would include data corresponding to those other response options. The end data field 412 designates the end of the alert data structure 400.

The data structure of the alert 400 may be in any desired programming language, and may include various other data fields as necessary or desired. In the case that the media system 202 is remote from the presentation device, the alert 300 may be transmitted immediately, periodically, and/or asynchronously after the media system determines that media content of interest is available. For example, the media system 202 may be configured to send each alert 300 immediately after content of interest becomes available, just prior to commencement of content of interests, at scheduled transmission times, and/or upon polling by the presentation device or the user. The alert 300 is then conveyed to the user by an audible, visual, and/or tactile notification, such as an indicator light, an audio alarm, a vibration, a text message, an email, a voicemail, an audio message, a video message, a multimedia message, and/or any other suitable notification.

Exemplary Media System

Figure 5:
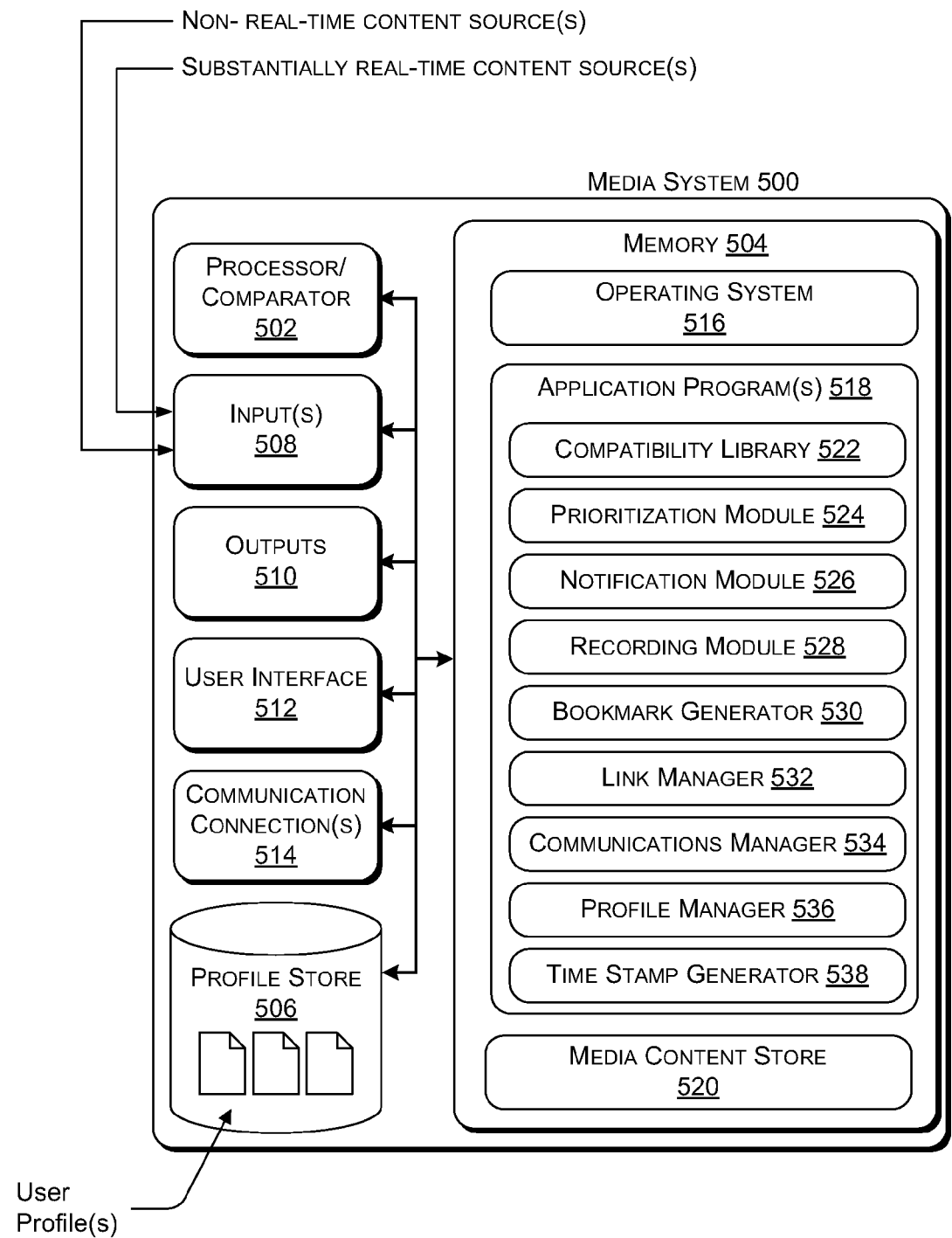
FIG. 5 is a schematic view showing an exemplary media system.

FIG. 5 illustrates an exemplary media system 500 according to one implementation in more detail. Generally, the media system 500 includes a processor or comparator 502 and memory 504, coupled to a profile store 506. The media system 500 also includes one or more inputs 508, including inputs from a variety of substantially real-time and non-real-time sources, one or more outputs 510 to a monitor, speakers, and/or other output devices, a user interface 512 for receiving input from a user, and communication connections 514 for sending and receiving information from one or more other computing devices and/or networks. The communication connections 514 include connections to remote media content sources, media stores, profile stores, web terminals, external presentation devices, and the like.

The comparator 502 is in communication with the other components of the media system 500 via a bus. The memory 504 generally includes an operating system 516, one or more application programs 518, and a media content store 520. In this implementation, the application programs 518 include a compatibility library 522, a prioritization module 524, a notification module 526, a recording module 528, a bookmark generator 530, a link manager 532, a communication manager 534, a profile manager 536, and a time stamp generator 538. The media store 520 may include virtually any type of non-real-time media.

The compatibility library 522 maintains and updates a database of media content formats that are compatible with the media system 500. When the media system 500 receives an alert, the compatibility library 522 compares the format of the content referenced in the alert to the database of compatible content formats and only displays the alert if the referenced content is compatible with the media system 500, according to exemplary implementations. Alternatively, the determination of whether available content is compatible with the media system 500 may be made prior to generation of the alert.

The prioritization module 524 and the profile manager 536 interact with the profile store 506 to prioritize and manage the preference information stored in the profile store 506. For example, the profile manager 536 may provide a user interface for manual entry of preference information and/or may include algorithms for intelligently inferring preferences based on the user's history of consumption. Several intelligent inference techniques are described above in the section entitled "Exemplary Preference-Based Media Alert Systems." Specific algorithms that could be used to implement such intelligent inference techniques would be within the knowledge of one of ordinary skill in the art.

Based at least in part on the preferences stored in the profile store 506, the comparator 502 compares information associated with content from the content sources with information in the profile store 506, and determines if any available content matches the user's profile and, therefore, may be of interest to the user. The notification module 526 alerts the user if the comparator 502 determines that content is available from one of the content sources that matches the user profile. In some implementations, the comparator 502 determines if any available content is of equal or higher priority than content currently being consumed by the user, and, according to exemplary implementations, the notification module 526 alerts the user only if content is available from one of the content sources that is of equal or higher priority to the user than content presently being presented.

As discussed above in the section entitled "Exemplary Alert," the alert 300 may prompt the user to select from among a number of response options, such as the number of response options 306. One response option that may be available to the user is to "Record" the media referenced in the alert 300. In that case, the media system 500 invokes the recording module 528 and directs it to record the media content referenced in the alert 300. This may require the media system 500 to provide the recording module 528 with a channel, URL, or other pointer to the content referenced in the alert 300. The link manager 532 stores and manages a link list of pointers corresponding to media content or locations therein and, at the request of the media system 500, forwards the appropriate pointer to the recording module 528. The recording module 528 then records the media content referenced in the alert 300 to the media content store 520 in memory 504, or a remote media content store such as that shown in FIG. 2.

Another response option that may be available to a user is to "Go To" the content referenced in the alert 300. Upon receipt of each alert 300, the link manager 532 may store any pointers included in the alert in the link list. If a user selects the "Go To" command, the link manager 532 provides the appropriate pointer for the media referenced in the alert 300. At that point, the media system 500 may interrupt the content presently being consumed to present the content referenced in the alert. In the illustrated implementation, the bookmark generator 530 is configured to mark a location in the original content before presenting the content referenced in the alert 300. Thus, once at least a portion of the content referenced in the alert 300 has been presented, the media system 500 can return to continue presenting the original content from the place where the user left off prior to the interruption.

The communications manager 534 application program schedules and routes communications between the media system 500, the content sources, any remote profile stores, media content stores, user terminals, and/or other network devices.

The time stamp generator 538 appends a time stamp to each alert generated by the notification module 526. As discussed above, the time stamp is a temporal indicator designating a time associated with the alert 300, such as when the alert was first generated, when the content referenced in the alert became available, or the like. The time stamp module 538 may also update existing time stamps to reflect times at which the alert 300 was transmitted, relayed, and/or received by the media system 500, among other things.

While the media system 500 is shown as having certain components, it should be understood that in some implementations, one or more of the components could be provided as a network device separate from the media system 500 or omitted entirely.

Also, while the media system 500 is shown and described as having certain hardware and software elements, it should be understood that the elements discussed above with regard to the media system 500 may be implemented by software, hardware or a combination thereof. If implemented by software, the software may reside on memory associated with any component of the media system 500, standalone memory provided in communication with the media system 500, a remote memory storage device, removable/nonremovable memory, a combination of the foregoing, or any other combination of one or more computer-readable media. For example, while the profile store 506 is shown and described as a single database, the database may be distributed over multiple computer-readable media and may include multiple sub-databases. Also, any number of programs, program modules, data objects, or other data structures may be stored in memory including an operating system, one or more application programs, other program modules, and program data.

Exemplary Preference-Based Media Alert Method

Figure 6:
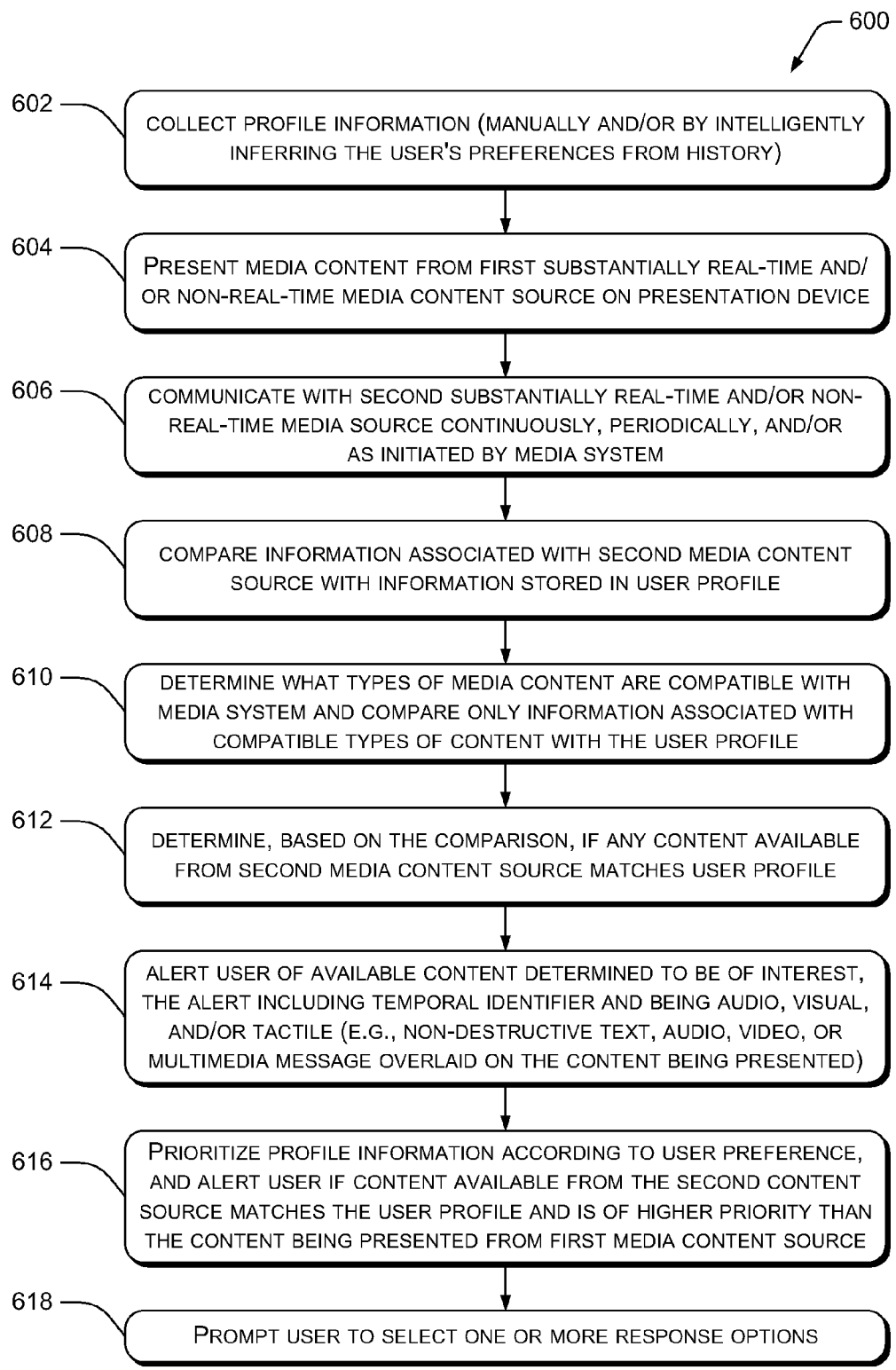
FIG. 6 is a schematic block diagram of an exemplary method of providing preference-based media alerts.

FIG. 6 is a flow chart showing an exemplary preference-based media alert method 600, to alert users when media content that is of interest to the user becomes available. The preference-based media alert method 600 may, but need not, be implemented at least partially by a preference-based media alert system, such as the preference-based media alert systems 100 and 200 shown in FIGS. 1 and 2, respectively, and/or a media system, such as the media system 500 shown in FIG. 5. The method 600 may be implemented as a service offered by a content provider or other service provider, as a program running on a media system, or in a variety of other configurations.

The method 600 includes, at 602, collecting profile information from a user, including the user's preferences for different types of media content. The user profile may be generated, for example, by manually entering profile information and/or by intelligently inferring the user's preferences from his or her viewing habits, as described in detail above in the section entitled "Exemplary Preference-Based Media Alert Systems."

At 604, the user consumes media content from a first media content source, which is being presented by a media system on a presentation device. The first media content source may be a substantially real-time content source, a non-real-time content source, or a combination of the two.

At 606, the media system communicates with and monitors at least one other media source (a second media source). Communication with the second media source may be continuous, periodic, and/or initiated by the media system or presentation device. The second media source may comprise substantially real-time media content, non-real-time content, or both, and may include video content, audio content, textual content, and/or multimedia content.

At 608, the media system compares information associated with the second media content source (e.g., textual data tags, closed captioning text, title, program guide description, etc.) with information stored in a user profile to determine if content is available that may be of interest to the user. The comparison may include a conventional keyword or natural language match, and/or a more sophisticated linguistic comparison. In one implementation, the comparison comprises an "intelligent" linguistic comparison using inference and deduction to recognize associations of similar and/or related words or concepts. For example, in addition to conventional keyword matching, the media system might infer a preference for songs about cars based on profile information "I like the song Little GTO." Similarly, the media system might recognize a match between profile information "I like baseball" and available coverage of the "World Series." Such intelligent prioritization and comparison may, in some instances, be based at least in part on ontological studies of the nature and relations of things. Typically, ontological relationships are created using linguistic comparator terms, such as "is related to," "also known as," and many others, rather than strictly superordinate/subordinate terminology relationships. Thus, relations can be created linguistically to facilitate deduction much as humans deduce. Inference and deduction can discover ontological relationships and create algorithms for employing these relationships in prioritizing user preferences for various media content. In this implementation, preferences may be inferred from logically related profile data. For example, ontology may be used to infer movie genres a person might like based on the users preference for some specific movie or movies and/or viewing habits. Of course, these ontological mechanisms may be used for inferring all manner of differing things from various data sets.

In some implementations, the media system determines, at 610, what types of media content are compatible with the media system, in which case, the comparison at 608 may compare only information associated with compatible types of content available from the second media content source with the user profile.

At 612, the media system determines, based on the comparison at 608, if any content available from the second media content source matches the user profile. If content is available that matches the user profile, at 614, the user is alerted of the available content that may be of interest. The alert may include an audio, visual, and/or tactile alert generated by the presentation device. In various implementations, the alert may include a text, audio, video, or multimedia message overlaid on the content being presented on the presentation device. In some implementations, the alert may also include a temporal identifier identifying when the alert was generated, when the alert was received at the presentation device, and/or when the alert was displayed by the presentation device. Typically, though not always, the alert is non-destructive of the media content being presented on the presentation device.

In some implementations, at 616, the profile information is prioritized or weighted according to user preference, and the user alerted if some or all of the content available from the second media content source matches the user profile and the matching content is of higher priority than the content being presented from the first media content source.

In some implementations, if content is available that matches the user profile and/or is of higher priority than the content being presented from the first media source, at 618, the user may be prompted to select one or more of the following actions:

interrupt the first media content source and present content from the second media content source, return to again present content from the first media content source after presenting at least a portion of content from the second media content source, record the content from the second media content source, store a pointer to content from the second media content source, or reject the second media content source in favor of the content being presented from the first media content source.

In other implementations, one or more of the foregoing actions may occur automatically without input from the user.

Specifics of an exemplary preference-based media alert method 600 are described above. However, it should be understood that certain acts in the method 600 need not be performed in the order described, may be modified, and/or may be omitted entirely, depending on the circumstances.

Also, any of the acts described above with respect to the method 600 may be implemented by a processor or other computing device based on instructions stored on one or more computer-readable media associated with a preference-based media alert system and/or media system. Computer-readable media can be any available media that can be accessed locally or remotely by a preference-based media alert system and/or media system. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a preference-based media alert system and/or media system. Combinations of the any of the above should also be included within the scope of computer-readable media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A media system comprising:

a memory storing non-real time media content for presentation;

a real-time media input to connect to a source of substantially real-time media content;

an output to a presentation device to present media content to a user, wherein the presentation device includes a library of types of media content with which it is compatible;

a user profile store comprising information about user media content preferences;

a prioritization module that assigns priority levels associated with media content to the information about user media content preferences based on a consumption history of the user; the consumption history including a user preference based on subject matter of an internet search performed by the user, viewing preferences of a user based on switching from one type of media content to another type of media content, inferences about the user based on a first time a user takes a certain action, multiple occurrences of a same action, or a discernable pattern related to viewing habits, and inferences based on the user's geographic location;

a comparator to compare information associated with the substantially real-time media content with the information about user media content preferences;

a recording module to record the substantially real-time media content;

a link manager for storing pointers to selected locations in the substantially real-time media content;

a notification module to:

in response to the comparator determining that the substantially real-time media content from the real-time media input is available and a priority level associated with the substantially real-time media content is of an equal or a higher priority level associated with non-real-time media content being presented on the presentation device:
in response to selection of a first user option:
interrupt the non-real-time media content being presented on the presentation device;
transmit an instruction to the presentation device to present the substantially real-time media content from the real-time media input;
in response to receiving a suppression command from the user, suppressing interruption of the non-real-time media content being presented on the presentation device for a predetermined period of time and alerting the user via a visual alert if the substantially real-time media content matches a portion of the information about user media content preferences and is of higher priority than the non-real-time media content being presented on the presentation device, wherein the visual alert comprises:
a textual message related to the subject matter of the internet search performed by the user;
a first indication of how much time has elapsed since a starting point of the substantially real-time media content; and
a temporal identifier identifying when the visual alert was generated, when the visual alert was received at the presentation device and when the visual alert was displayed on the presentation device;
in response to selection of a second user option, transmit an instruction to the recording module to record the substantially real-time media content, transmit an instruction to the presentation device to continue presentation of the non-real-time media content being presented on the presentation device and store a pointer to the substantially real-time media content at the link manager;
in response to selection of a third user option, reject the substantially real-time media content in favor of the non-real-time media content being presented on the presentation device;
a bookmark generator to mark a location in the non-real-time content being presented on the presentation device when interrupted.

2. The media system of claim 1, wherein the presentation device presents the non-real-time media content being presented on the presentation device after the interruption to present a portion of the substantially real-time media content.

3. The media system of claim 1, wherein the link manager includes a pointer to a really simple syndication feed.

4. The media system of claim 1, wherein the user profile store is modifiable by user entry of preferences and learned history of user media consumption.

5. A method comprising:
presenting content from a first media content source on a presentation device;
communicating with a second media content source;
comparing information associated with the second media content source with information stored in a user profile;
assigning priority levels associated with content to the information stored in the user profile based on a consumption history of the user, the consumption history including a user preference based on subject matter of an internet search performed by the user, viewing preferences of a user based on switching from one type of media content to another type of media content, inferences about the user based on a first time a user takes a certain action, multiple occurrences of a same action, or a discernable pattern related to viewing habits, and inferences based on the user's geographic location;
determining, based on the comparing, if any content available from the second media content source matches the information stored in the user profile;
upon determining that a priority level associated with the content available from the second media content source is equal to or higher than a priority level of content being presented from the first media content source:
presenting a user with a first option, a second option and a third option;
in response to user selection of the first option:
interrupting presentation of the content being presented from the first media content source;
presenting the content available from the second media content source on the presentation device; and
marking a location in the media content being presented from the first media content source when interrupted;
in response to receiving a suppression command from the user, suppressing interruption, for a predetermined period of time and alerting, via a visual alert, the user if the content available from the second media content source is of a higher priority level than the content being presented from the first media content source, wherein the visual alert comprises:
a textual message related to the subject matter of the internet search performed by the user;
a first indication of how much time has elapsed since a starting point of the available substantially real-time media content; and
a temporal identifier identifying when the visual alert was generated, when the visual alert was received at the presentation device and when the visual alert was displayed on the presentation device;
in response to user selection of the second option:
recording the content available from the second media content source;
continuing presentation of the content being presented from the first media content source; and
storing a pointer to the content available from the second media content source; and
in response to selection of the third user option:
rejecting the content available from the second media content source in favor of the media content being presented from the first media content source.

6. The method of claim 5, wherein the first media content source comprises non-real-time media content.

7. The method of claim 5, wherein the second media content source comprises substantially real-time media content.

8. The method of claim 5, further comprising:
prioritizing respective types of media content in the user profile.

9. The method of claim 5, further comprising: after an interruption of the content from the first media content source, presenting the content from the first media content source after presenting a portion of the content available from the second media content source.

10. The method of claim 5, wherein the pointer is a really simple syndication feed.

11. The method of claim 5, wherein the visual alert is overlaid on content being presented on the presentation device.

12. The method of claim 5, wherein the content available from the second media content source comprises: video content, audio content, text content, and multimedia content.

13. The method of claim 5, wherein the information associated with the second media content source comprises: textual data tags, closed captioning text, title, and program guide description corresponding to the content from the second media content source.

14. The method of claim 5, further comprising:
- determining respective types of content that are compatible with the presentation device; and
- comparing only information associated with compatible types of content available from the second media content source with the user profile.

15. The method of claim 5, wherein the user profile is generated by user entry of preferences, learned history of user media consumption, deduction, induction, and a combination of the foregoing.

16. The method of claim 5, wherein the user profile is generated by intelligently inferring user preferences from a history of user media consumption.

17. The method of claim 5, wherein the visual alert comprises a temporal identifier identifying: when the visual alert was generated, when the visual alert was generated, when the visual alert was received at the presentation device, and when the visual alert was displayed by the presentation device.

18. A non-transitory computer readable medium containing computer-executable program instructions that, if executed by a computing device, cause the computing device to perform operations comprising method of claim 5.

* * * * *